UNITED STATES PATENT OFFICE.

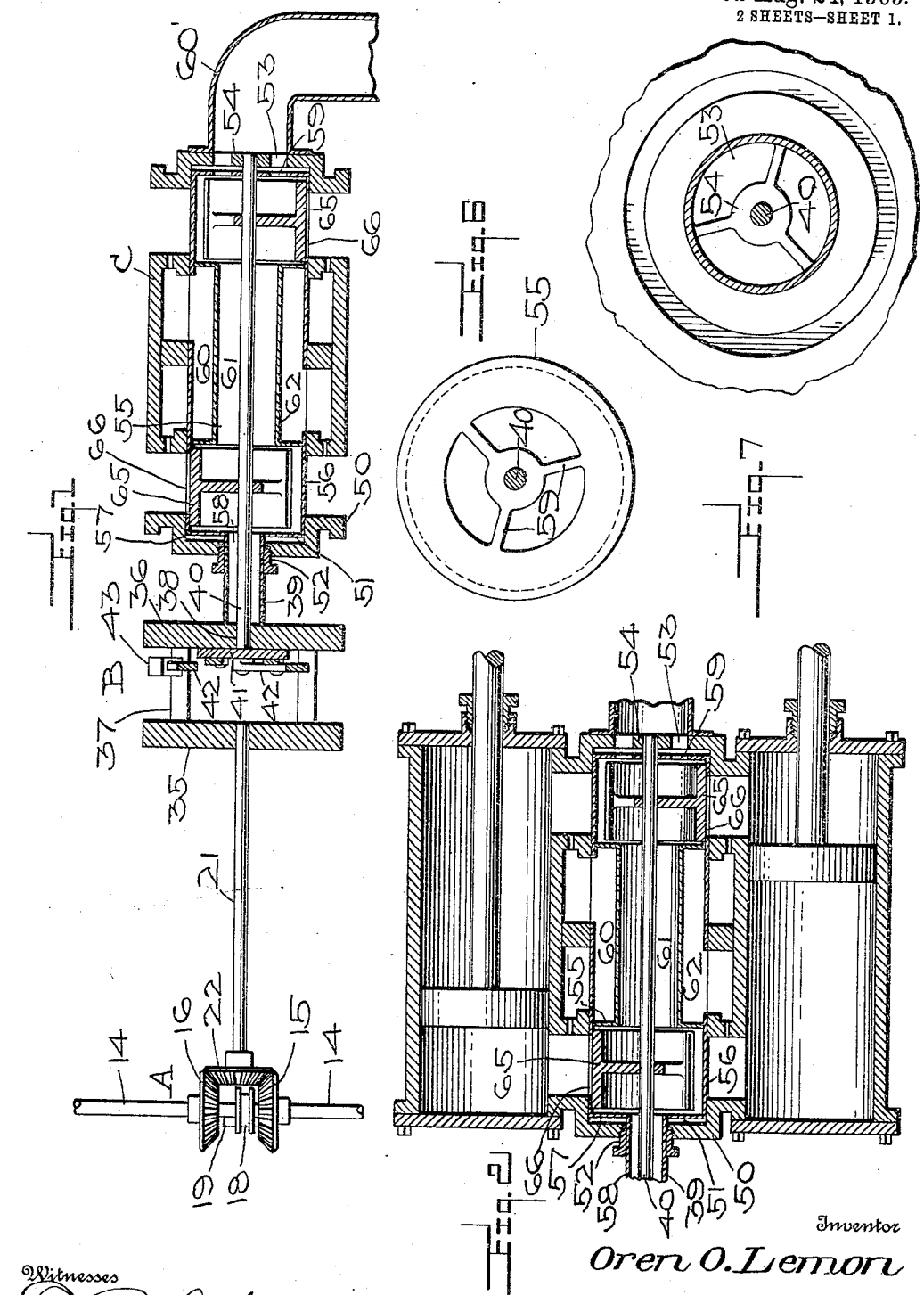

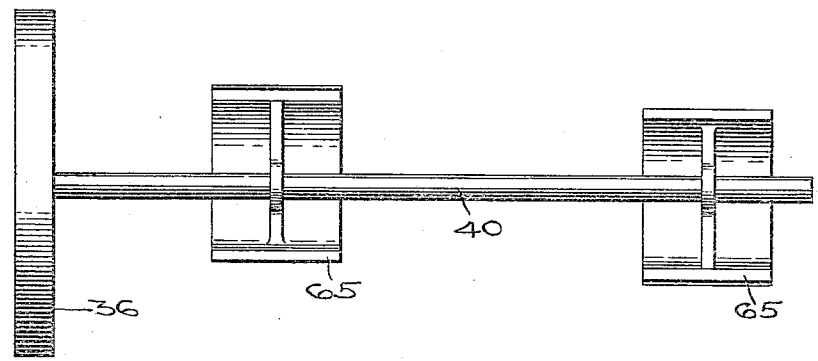
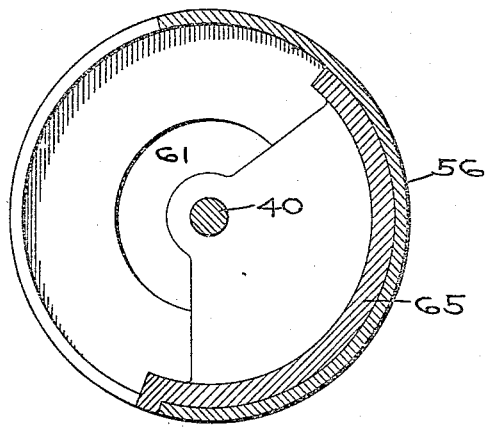
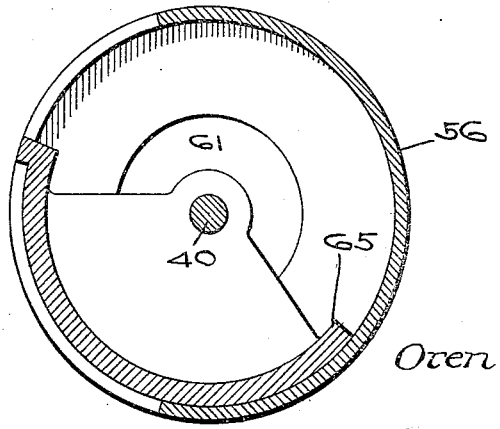

OREN O. LEMON, OF CAMBRIA, VIRGINIA.

ROTARY VALVE-GEAR.

931,934.  Specification of Letters Patent.  Patented Aug. 24, 1909.

Application filed May 12, 1908. Serial No. 432,527.

*To all whom it may concern:*

Be it known that I, OREN O. LEMON, a citizen of the United States, residing at Cambria, in the county of Montgomery and State of Virginia, have invented certain new and useful Improvements in Rotary Valve-Gears, of which the following is a specification.

This invention relates to steam engines, and more particularly to valves therefor, and has for its object to provide a rotary valve having novel and desirable features.

Another object is to provide a valve which may be manufactured principally from sheet material.

Another object is to provide a valve of the type indicated, the manipulation of which will be readily understood by engineers and mechanics without difficulty.

Another object is to provide a valve that may be manufactured at low cost.

Other objects and advantages will be apparent from the following description, and it will be understood that changes in the specific structure shown and described may be made within the scope of the claims, and that any suitable materials may be used without departing from the spirit of the invention.

In the drawings forming a portion of this specification, and in which like characters of reference indicate similar parts in the several views, Figure 1 is a schematic view of the device, Fig. 2 is a longitudinal cross sectional view of the valve engaged in a chamber for a two cylinder engine, Fig. 3 is a detail view of the governor shaft and cut off shutters, Fig. 4 is a cross sectional view of the valve midway of one of the ports, showing the cut off in open position, Fig. 5 is a similar view showing the cut off in restricted position, Fig. 6 is an end view of the valve, Fig. 7 is an end view of the valve chamber.

Referring to the drawings, there is shown a valve mechanism comprising engine shaft connections A, governor B, and a valve C.

The valve mechanism C comprises a casing 50 having a cylindrical chamber 51 therein and provided with a bearing 52 at one end receiving a stem 39 of a valve member 55 subsequently to be described, and provided at its opposite end with an inlet opening 53, centrally of which there is a bearing 54 arranged to receive the inner end of a cut off shaft 40, the opposite end of the shaft being disposed revolubly in the stem 39. The stem 39 and shaft 40 are engaged with a rotating governor B. Engaged revolubly in the chamber 51 there is a valve member 55 comprising a cylinder having a wall portion 56, and, provided with a head 57 at one end through which there is formed an opening 58 in which there is fixed the stem 39. The opposite end of the cylinder is provided with a cross arm 59 having bearings formed therein receiving revolubly the shaft 40. It will thus be seen that the valve 55 is supported by the stem 39 at one end and by the shaft 40 at the other. The middle portion of the valve is partitioned as shown at 62 to form an exhaust chamber 60 through which extends a tubular passage 61, the walls of which are in spaced relation with the surface of the shaft 40 extending revolubly therethrough. The walls 56 of the valve are provided with ports 66 of rectangular shape, spaced longitudinally, alternate ports being disposed at opposite sides of the said member. Suitable inlet and exhaust ports are formed in the walls of the casing 50 and arranged for coöperation with the ports 66 of the valve member 55 upon rotation thereof.

It will be understood that the casing 50 may be made in any suitable form for connection with steam engines. It will be understood also that the valve may be arranged for operation of a plurality of cylinders by the proper disposition of ports in the circumference of the chamber 50 and the provision of suitable exhaust connections therefor.

Semi-circular shutters 65 are secured to the shaft 40 within opposite ends of the cylinder 56 and arranged for sliding engagement over the ports 66 upon rotation of the shaft 40. It will be observed that when the valve is rotated the shaft 40 is free to rotate under the action of a governor for variable restriction of the ports 66, causing an earlier or later cut off of steam entering the receiving chamber thus governing the speed of the engine.

It will be understood that if desired, reversal of the engine may be accomplished by diverting the supply from the inlet chamber to the exhaust chamber, thus obviating the necessity for a reversing mechanism.

A radial longitudinally extending flange Z is carried by each of the shutters 65, on one edge projecting outwardly through the adjacent ports 66 of the member 55 and adapted to engage slidably against the inner face of the chamber 51.

It will be understood that any suitable connections may be made between inlet and exhaust pipes for conducting steam to and from the valve.

What is claimed is:—

1. In a rotary valve the combination with a cylindrical casing having inlet and exhaust openings, and having ports adapted for communication with opposite engine cylinders, of a hollow cylinder disposed revolubly in the casing and having inlet and exhaust ports spaced longitudinally and circumferentially thereof, said inlet ports disposed at opposite ends and sides of the cylinder, said exhaust ports being spaced inwardly of the inlet ports at opposite sides of the cylinder, said cylinder having a central exhaust chamber therein, and having inlet chambers at its opposite ends, said inlet chambers being connected by a passage extending concentrically of the cylinder, a shaft engaged revolubly in said cylinder, shutters carried by said shaft and arranged for sliding engagement over said inlet ports upon relative rotation of the shaft, said cylinder having a longitudinally extending hollow valve stem at one end carrying an operating governor, and having a steam inlet passage at the opposite end, said shaft extending outwardly of said cylinder through said hollow stem and being engaged with the governor.

2. In a rotary valve, the combination with a cylindrical casing having inlet and exhaust openings and opposite ports adapted for communication with an engine cylinder, of a cylinder having headed ends, a hollow stem carried by one end, the other end having a steam inlet opening, said cylinder having a central exhaust chamber and having steam inlet chambers at opposite ends connected by a communicating passage extending concentrically of the cylinder said cylinder having a plurality of longitudinally spaced oppositely disposed ports adapted to communicate at times with said ports.

In testimony whereof I affix my signature, in presence of two witnesses.

OREN O. LEMON.

Witnesses:
M. M. CARTER,
R. G. FISHER.